(12) United States Patent
Yokawa

(10) Patent No.: US 6,481,308 B2
(45) Date of Patent: Nov. 19, 2002

(54) SHIFTING DEVICE FOR AN AUTOMATIC TRANSMISSION

(75) Inventor: Seiji Yokawa, Sagamihara (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 09/858,659

(22) Filed: May 17, 2001

(65) Prior Publication Data

US 2001/0047694 A1 Dec. 6, 2001

(30) Foreign Application Priority Data

May 24, 2000 (JP) .................................. 2000-153657

(51) Int. Cl.⁷ .............................................. F16H 59/00
(52) U.S. Cl. ............................... 74/473.33; 74/471 XY
(58) Field of Search ..................... 74/471 XY, 473.32, 74/473.33

(56) References Cited

U.S. PATENT DOCUMENTS

| | | | | |
|---|---|---|---|---|
| 3,795,157 A | * | 3/1974 | Campbell et al. | 74/473.33 |
| 4,068,537 A | * | 1/1978 | Wolfe | 74/473.21 |
| 4,138,903 A | * | 2/1979 | Burdette et al. | 74/473.33 |
| 4,610,335 A | * | 9/1986 | Miyazawa et al. | 192/109 D |
| 4,631,984 A | * | 12/1986 | Jones | 74/473.12 |
| 4,676,350 A | * | 6/1987 | Shinokawa et al. | 74/471 XY |
| 4,916,964 A | * | 4/1990 | Crack | 74/471 XY |
| 5,090,540 A | * | 2/1992 | Hasegawa et al. | 74/473.3 |
| 5,184,523 A | * | 2/1993 | Nyzedatny | 74/471 XY |
| 5,842,384 A | * | 12/1998 | Berger | 74/529 |

FOREIGN PATENT DOCUMENTS

| | | |
|---|---|---|
| DE | 39 24 318 A1 | 1/1991 |
| EP | 0 722 057 A1 | 7/1996 |
| FR | 2 672 952 A1 | 8/1992 |
| JP | 6-30799 U | 4/1994 |
| JP | 9-4702 A | 1/1997 |

* cited by examiner

Primary Examiner—William C Joyce
(74) Attorney, Agent, or Firm—Shinjyu Global IP Counselors, LLP

(57) ABSTRACT

A shifting device for an automatic transmission is capable of accurate shift operation. The reverse position R of the shift lever 1 is not located along the shift lever operation path between the parking position P and drive position D. Accurate shift lever operation is made possible because the shift lever 1 does not pass through the reverse position R when the vehicle is shifted from a parked state into forward operation.

14 Claims, 12 Drawing Sheets

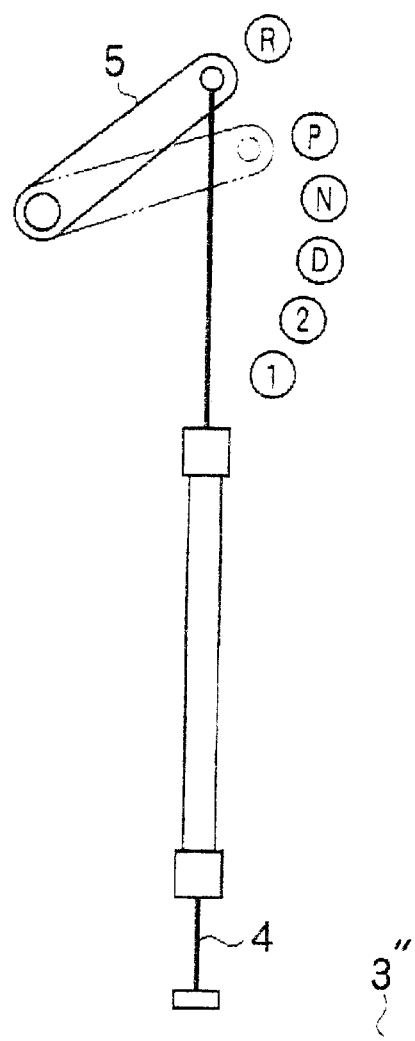
Fig. 8
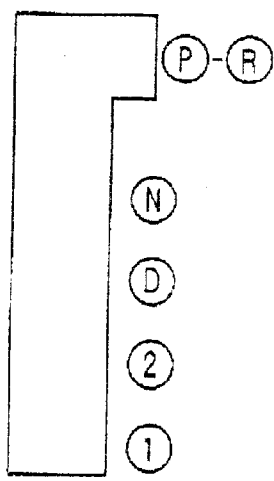

SHIFTING DEVICE FOR AN AUTOMATIC TRANSMISSION

BACKGROUND OF THE INVENTION

1. Field of the Invention

The present invention generally relates to a shifting device for an automatic transmission. More specifically, the present invention relates an improved shifting pattern of a shifting device for an automatic transmission.

2. Background Information

Conventional shifting devices for automatic transmissions typically have a shifting pattern that has a plurality of shift positions arranged in the longitudinal direction of the vehicle with the first item in the pattern being closest to the front of the vehicle. One common shifting pattern has a parking position P, a reverse position R, a neutral position N, a drive position D, etc. arranged sequentially in the longitudinal. An example of this type of shifting pattern is disclosed in Laid-Open Japanese Patent Publication No. 6-30799.

With this conventional shifting pattern, the shift lever must be moved toward the rear of the vehicle from the parking position P to the drive position D in order to begin driving the vehicle forward from a parked condition (i.e., a condition where the shift lever is in the parking position P). This shifting pattern is a source of annoyance because the reverse position R is disposed between the parking position P and the drive position D. Consequently, the driver must be certain the shift lever is securely in the drive position D before releasing his or her foot from the brake.

Similarly, the shift lever must be moved toward the rear of the vehicle from the parking position P to the reverse position R in order to begin driving the vehicle in reverse from a parked condition (i.e., a condition where the shift lever is in the parking position P). This shifting pattern is also a source of annoyance because the drive position D is disposed on an extension of the straight line running from the parking position P to the reverse position R, and again, the driver must be certain the shift lever is securely in the reverse position R before releasing his or her foot from the brake.

The same problem exists when the shifting device has a crank-like form. For example, see the shifting device described in Laid-Open Japanese Patent Publication No. 9-4702.

In view of the above, there exists a need for a shifting device, which overcomes the above-mentioned problems in the prior art. This invention addresses this need in the prior art as well as other needs, which will become apparent to those skilled in the art from this disclosure.

SUMMARY OF THE INVENTION

Therefore, one object of the present invention is to provide a shifting device for an automatic transmission that can reduce the annoyance associated with shifting while also providing accurate shift operation.

The forgoing object can be attained by providing a shifting device for an automatic transmission that has a shifting member movably arranged along a shift path between a stop position, a drive position, and a reverse position, wherein the stop position is located in the shift path between the drive position and the reverse position such that the shifting member passes through the stop position when moved between the drive position and the reverse position.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 8 is a simplified schematic view of an operating force transmitting system for the shifting device of the third embodiment of the present invention illustrated in FIGS. 6 and 7;

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

Figure 1:
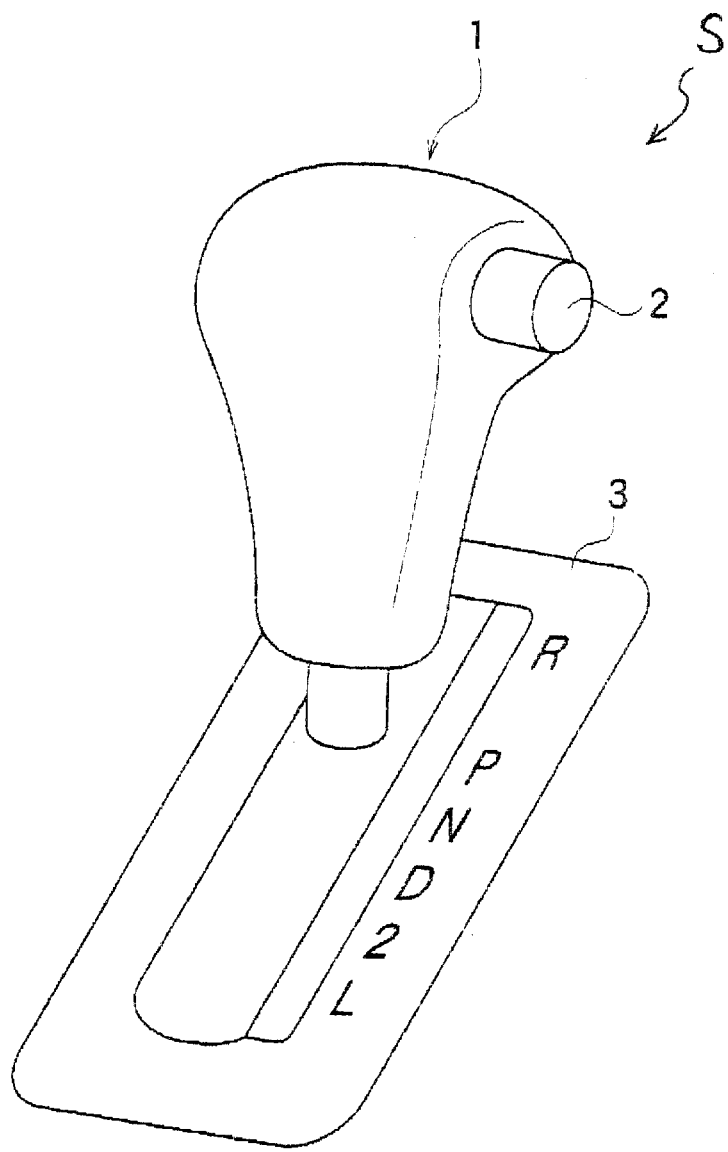
FIG. 1 is a perspective view of a shifting device with a first shifting pattern in accordance with a first embodiment of the present invention.
Figure 2:
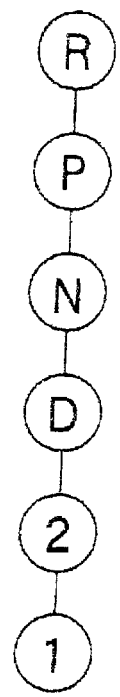
FIG. 2 is a diagrammatic representation of the shifting pattern corresponding to the shifting device of the first embodiment of the present invention illustrated in FIG. 1.

Referring initially to FIG. 1, a shift operation part of a shifting device S is illustrated to explain a first shifting pattern of a first embodiment of the present invention. The shift operation part of the shifting device S basically includes a shift lever 1 having a shift lock knob 2 provided on one side of the upper end portion of the shift lever 1 and a shift position indicator 3. As best seen in FIG. 2, the shifting pattern of the shift lever 1 preferably has a plurality (six) of shift positions, i.e., a reverse position R, a parking position P, a neutral position N, a drive position D, a second drive position "2", and a low position L.

In this embodiment, the six of shift positions are linearly arranged in the longitudinal direction of the vehicle. The reverse position R is the front position that is closest to the front end of the vehicle. The parking position P is a "stop" position that is located in front of the drive position D of a set of "forward gear positions" that includes the drive position D, the second position "2", and the low position L. The shift lever 1 can be shifted among the "forward gear positions" and the "stop position" by moving it linearly in the longitudinal direction of the vehicle. The reverse position R is provided in front of the parking position P, not between the drive position D, neutral position N and parking position P of the operating or shifting path of the shift lever 1.

Figure 3:
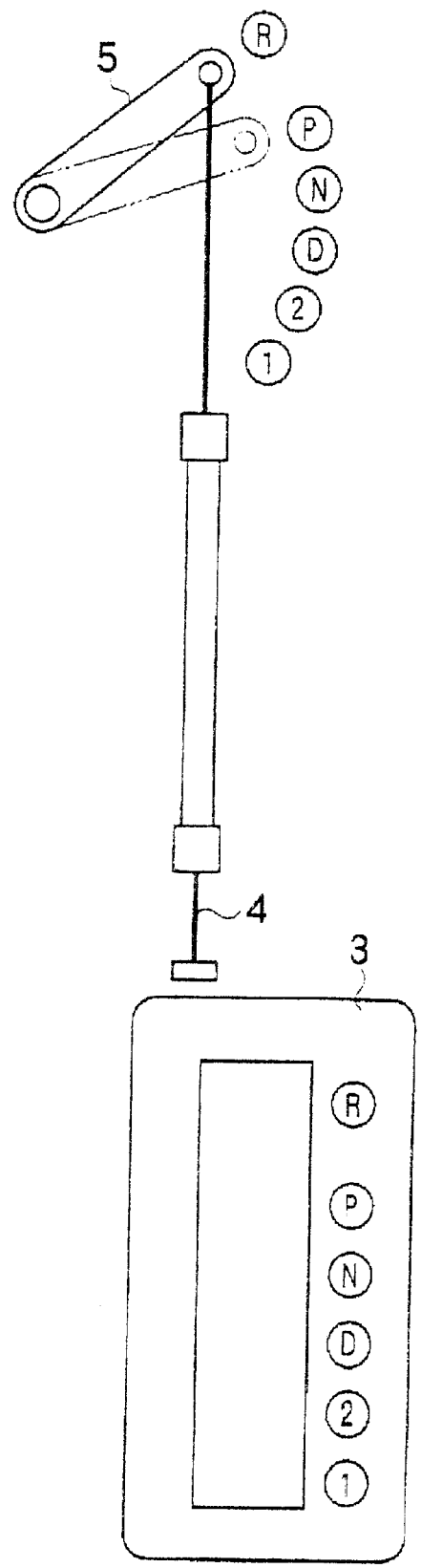
FIG. 3 is a simplified schematic view of an operating force transmitting system for the shifting device of the first embodiment of the present invention illustrated in FIGS. 1 and 2.

As shown in FIG. 3, an operating force transmitting system for the shifting device S is diagrammatically illustrated. The operating force transmitting system or apparatus basically includes a control wire 4 and a position converting lever 5. The operating force transmitting system is a relatively conventional component that is well known in the art. Since operating force transmitting systems are well known in the art, the structures of the operating force transmitting system will not be discussed or illustrated in detail herein.

One end of the control wire 4, which serves as the control linking member, is coupled to shift lever 1 and the other end of control wire 4 is coupled to the position converting lever 5 on the transmission side. The operating force of the shift lever 1 is transmitted to position the converting lever 5 by means of this control wire 4. Although this embodiment uses a control wire 4 as the control linking member, a rod or other type of linking member can also be used depending on the specifications of the vehicle. With the structure of this embodiment, the shift lever 1 does not pass through the reverse position R when the vehicle is shifted into forward operation from the parked condition (i.e., from a condition where the shift lever is at the parking position P). Therefore, an accurate shifting operation can be accomplished.

In particular, since the neutral position N and the parking position P are in positions preceding the drive position D in order as stated and the reverse position R is in the position preceding the parking position P, the shift lever 1 must pass through the parking position P when it is shifted from the drive position D to the reverse position R or from the reverse position R to the drive position D. Consequently, the vehicle must necessarily come to a temporary stop and the shifting operation of the shift lever 1 can be accomplished with an even higher degree of accuracy.

Moreover, when the shift lever 1 is shifted from the parking position P to the drive position D in order to drive forward, the driver need not check to make sure the shift lever 1 has been securely positioned in the drive position D before releasing his or her foot from the brake because the reverse position R does not exist between those two positions. Also, when the shift lever 1 is shifted from the parking position P to the reverse position R in order to drive in reverse, the reverse position R can be reached by shifting the shift lever 1 from the parking position P to the last position in the forward direction of the vehicle. Here again, the driver need not check to make sure the shift lever 1 has be securely positioned in the reverse position R before releasing his or her foot from the brake and, consequently, there is no annoyance associated with the shift lever operation.

In summary, the shifting device S of the present invention enables accurate operation of the shift lever 1 when changing the vehicle from a parked state to a forward moving state because the shift lever 1 does not pass through the reverse position R. Moreover, the shift lever 1 must pass through at least one stop position P and, consequently, the vehicle must necessarily come to a temporary stop when the shift lever 1 is shifted from one of the drive position D or "2" or L to the reverse position R, or from the reverse position R to one of the drive position D or "2" or L. As a result, the accuracy of the shifting operation can be improved even further, and the shifting device S of the present invention can reduce the annoyance associated with operating the shift lever 1.

Second Embodiment

Figure 4:
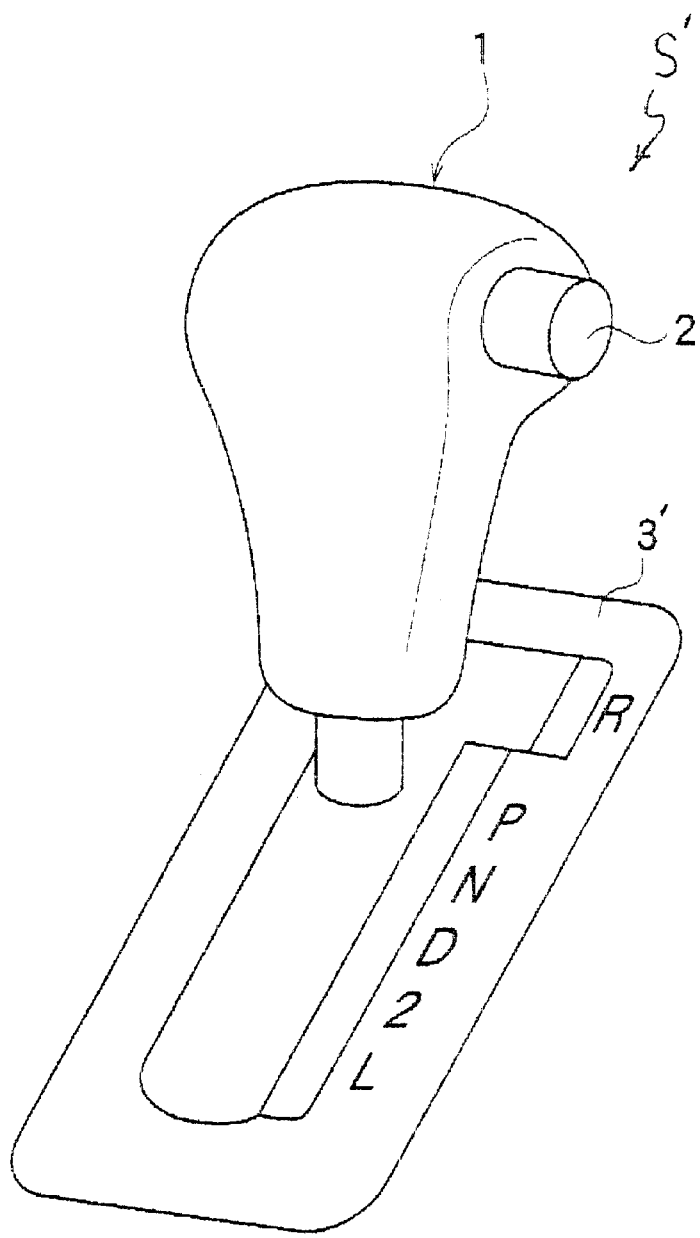
FIG. 4 is a perspective view of a shifting device with a second shifting pattern in accordance with a second embodiment of the present invention.
Figure 5:
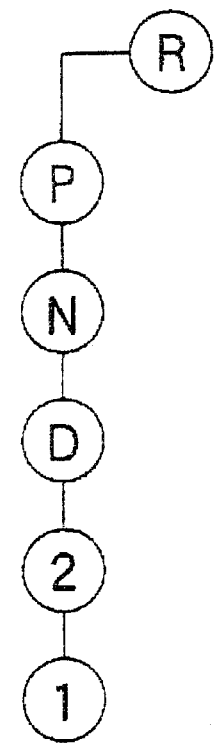
FIG. 5 is a diagrammatic representation of the shifting pattern corresponding to the shifting device of the second embodiment of the present invention illustrated in FIG. 4.

Referring now to FIGS. 4 and 5, a shifting device S' with a modified shifting pattern is illustrated in accordance with a second embodiment of the present invention. The shift operation part of the shifting device S' of the second embodiment basically includes a shift lever 1 with a shift lock knob 2 provided on one side of the upper end portion of the shift lever 1 and a shift position indicator 3'. Also, the operating force transmitting system illustrated in FIG. 3 can be used in this second embodiment with slight modifications thereto. Thus, the shift position indicator 3' and the shifting pattern of the second embodiment are the only significant differences from the first embodiment. In view of the similarity between the first and second embodiments, the parts of the shifting device S' of the second embodiment that are identical to the parts of the shifting device S of the first embodiment will be given the same reference numerals as the parts of the first embodiment. Moreover, the descriptions of the parts of the shifting device S' of the second embodiment that are identical to the parts of the first embodiment have been omitted.

As best seen in FIG. 5, the shifting pattern of the shift lever 1 preferably has a plurality (six) of shift positions, i.e., a reverse position R, a parking position P, a neutral position N, a drive position D, a second drive position "2", and a low position L. As illustrated by the shifting pattern shown in FIG. 5, the reverse position R of this embodiment is located in a position that not only precedes the parking position P, but also requires the shift lever 1 to be moved in the lateral direction of the vehicle.

When the shift lever 1 is shifted from the parking position P to the reverse position R, the shift lever 1 is first moved linearly in the forward direction of the vehicle. If the driver releases his or her hand from the shift lever 1 after linearly moving it in the forward direction of the vehicle, a flat spring or other shift position holding mechanism returns the shift lever 1 to the parking position P. The shift position holding mechanism is a relatively conventional component that is well known in the art. Since shift position holding mechanisms are well known in the art, the structures of the shift position holding mechanism will not be discussed or illustrated in detail herein.

Also, after the shift lever 1 has been moved in the lateral direction of the vehicle to the reverse position R, the reverse position R is held by a position holding mechanism similar to the one previously mentioned.

Therefore, in addition to the effects of the first embodiment, the shifting device S' of the second embodiment can improve the accuracy of the shifting operation because operation of the shift lever 1 in the lateral direction of the vehicle is required when the shift lever 1 is shifted from the parking position P to the reverse position R.

Third Embodiment

Figures 6, 7:
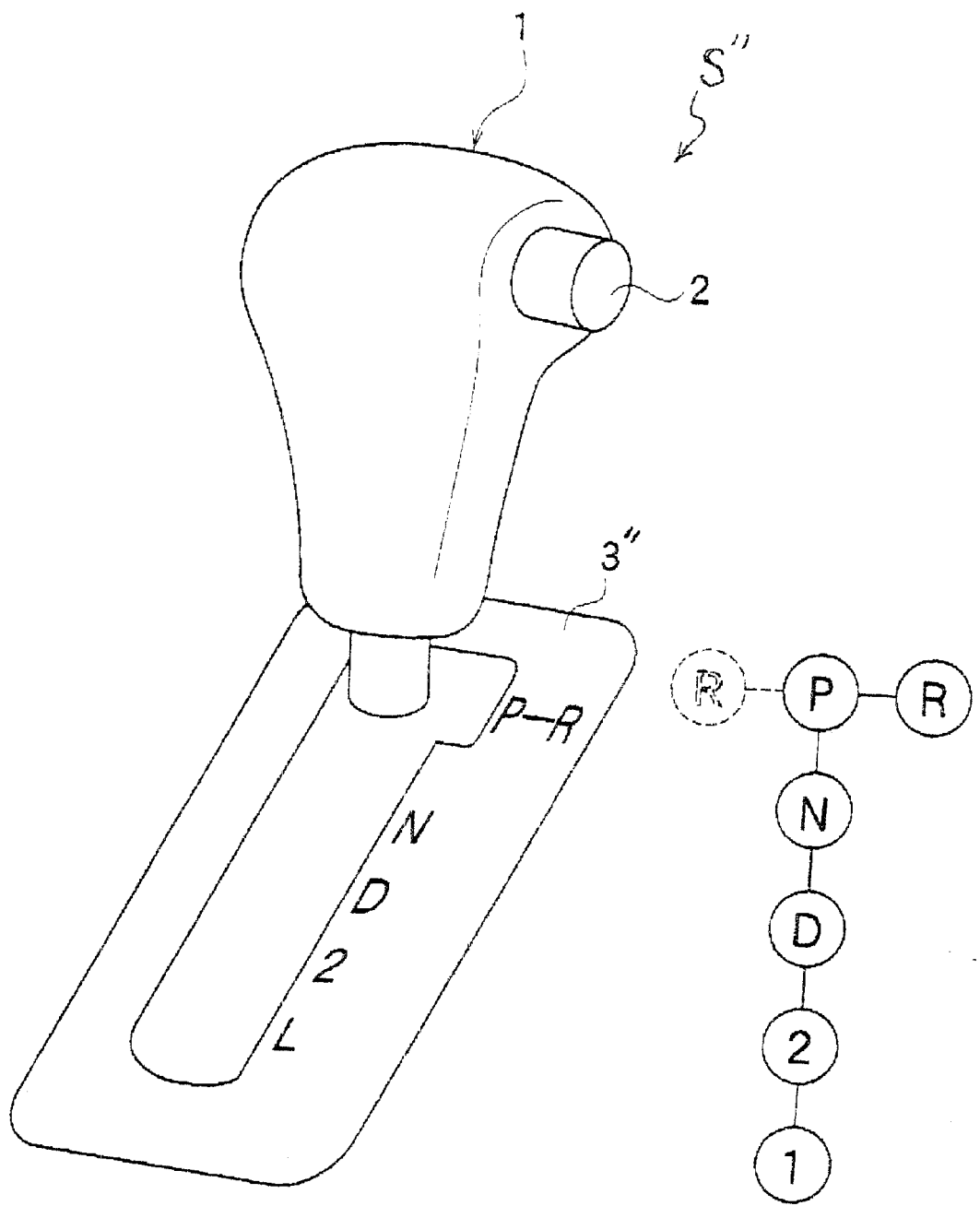
FIG. 6 is a perspective view of a shifting device with a third shifting pattern in accordance with a third embodiment of the present invention.
FIG. 7 is a diagrammatic representation of the shifting pattern corresponding to the shifting device of the third embodiment of the present invention illustrated in FIG. 6.

Referring now to FIGS. 6–8, a shifting device S" with a modified shifting pattern is illustrated in accordance with a third embodiment of the present invention. The shift operation part of the shifting device S" of the third embodiment basically includes a shift lever 1 with a shift lock knob 2 provided on one side of the upper end portion of the shift lever 1 and a shift position indicator 3". Also, the operating force transmitting system illustrated in FIG. 8 is substantially identical to the operating force transmitting system illustrated in FIG. 3, with slight modifications in the supporting structure. Thus, the shift position indicator 3'" and the shifting pattern of the third embodiment are the only significant differences from the first embodiment. In view of the similarity between the first and third embodiments, the parts of the shifting device S" of the third embodiment that are identical to the parts of the first embodiment will be given the same reference numerals as the parts of the first embodiment. Moreover, the descriptions of the parts of the shifting device S" of the third embodiment that are identical to the parts of the first embodiment can be omitted.

As best seen in FIG. 7, the shifting pattern of the shift lever 1 preferably has a plurality (six) of shift positions, i.e., a reverse position R, a parking position P, a neutral position N, a drive position D, a second drive position "2", and a low position L. As illustrated by the shifting pattern shown in FIG. 7, the reverse position R of this embodiment is offset from parking position P in the lateral direction of the vehicle.

Therefore, in addition to the effects of the first embodiment, the constituent features of the third embodiment allow the shift lever 1 to be shifted from the parking position P to the reverse position R by merely moving the shift lever 1 from the parking position P in the lateral direction of the vehicle. As a result, the shift lever operation from the stop position to the reverse position is easier to understand and the accuracy of the shift lever operation can be improved. Also, after the shift lever 1 has been moved in the lateral direction of the vehicle to the reverse position R, the reverse position R is held by a position holding mechanism similar to the one previously mentioned in the second embodiment. The shift position holding mechanism is a relatively conventional component that is well known in the art. Since shift position holding mechanisms are well known in the art, the structures of the shift position holding mechanism will not be discussed or illustrated in detail herein.

Fourth Embodiment

Figures 9, 10:
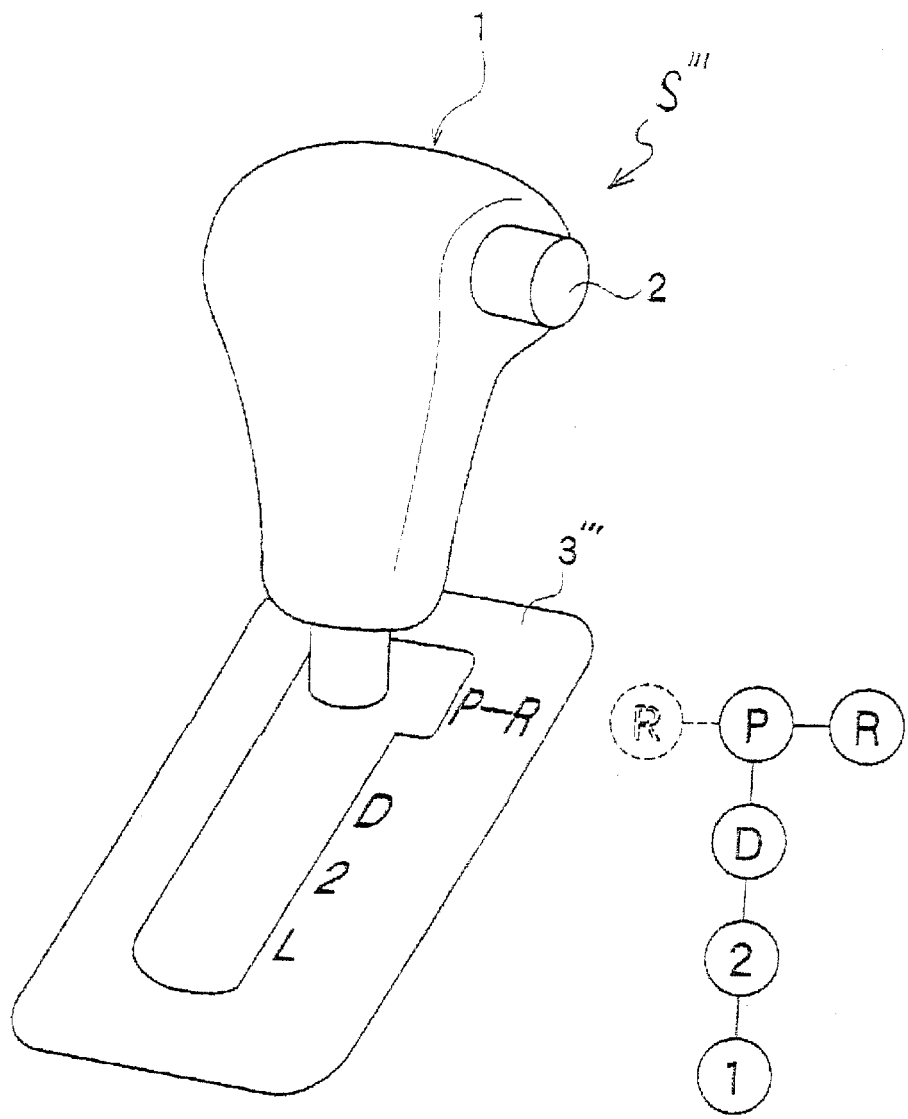
FIG. 9 is a perspective view of a shifting device with a fourth shifting pattern in accordance with a fourth embodiment of the present invention.
FIG. 10 is a diagrammatic representation of the shifting pattern corresponding to the shifting device of the fourth embodiment of the present invention illustrated in FIG. 9.
Figure 11:
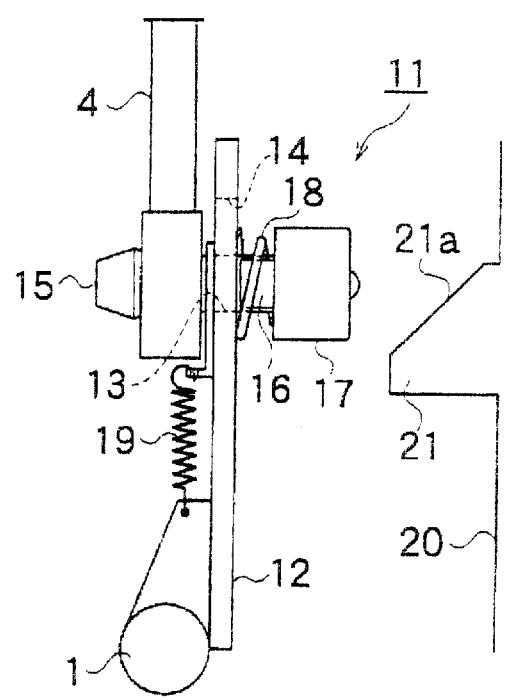
FIG. 11 is a simple schematic view of the operating force direction-converting mechanism of a first embodiment of the present invention.
Figure 12:
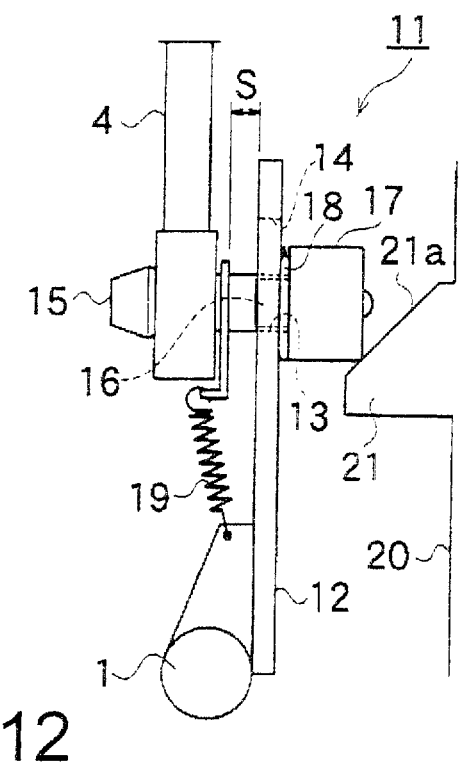
FIG. 12 is a simple schematic view illustrating the operating force direction-converting mechanism of FIG. 11 in an intermediate stage along the way to the operating force direction-converting condition.

Referring now to FIGS. 9 and 10, a shifting device S'" with a modified shifting pattern is illustrated in accordance with a fourth embodiment of the present invention. The shift operation part of the shifting device S" of the fourth embodiment basically includes a shift lever 1 with a shift lock knob 2 provided on one side of the upper end portion of the shift lever 1 and a shift position indicator 3'". Also, the operating force transmitting system illustrated in FIG. 8 can be used in this fourth embodiment with slight modifications thereto. Thus, the shift position indicator 3'" and the shifting pattern of the fourth embodiment are the only significant differences from the prior embodiments. In view of the similarity between the prior embodiments and the fourth embodiments, the parts of the shifting device S'" of the fourth embodiment that are identical to the parts of the first embodiment will be given the same reference numerals as the parts of the first embodiment. Moreover, the descriptions of the parts of the shifting device S'" of the fourth embodiment that are identical to the parts of the first embodiment can be omitted.

As best seen in FIG. 10, the shifting pattern of the shift lever 1 preferably has a plurality (five) of shift positions, i.e., a reverse position R, a parking position P, a drive position D, a second drive position "2", and a low position L. With this embodiment, the neutral position N has been eliminated and the reverse position R is offset in the lateral direction of the vehicle from the parking position P, which is the sole stop position. Therefore, almost the same effects can be obtained in this embodiment as those of the third embodiment.

Operating Direction-Converting Mechanism

Each of embodiments 2 to 4 involves shifting the shift lever 1 in the lateral direction of the vehicle when shifting between the parking position P or neutral position N and the reverse position R. As shown in FIG. 8, it is necessary to convert the laterally directed operating force of shift lever 1 so that it is transmitted in the line direction of the control wire 4. In other words, when the shift lever 1 is operated from the parking position P or the reverse position R, the shift lever 1 is moved in a lateral direction relative to the longitudinal direction of the vehicle. Thus, as shown in FIGS. 11 to 14, the shift lever 1 is provided with an operating force direction-converting mechanism 11. The operating force direction-converting mechanism 11 converts the acting direction of the operating force of shift lever 1 to the line direction of the control wire 4 when the shift lever 1 is operated in the lateral direction of the vehicle between the stop position (parking position P) and the reverse position R.

As best seen in FIGS. 11 to 14, the operating force direction-converting mechanism 11 basically includes a coupling plate 12 with a pin through hole 13 and a slot 14, a coupling pin 15 with a non-circular part 16, a bracket 15a located on the coupling pin 15, a pin head 17 coupled to the coupling pin 15 by fastener 17a, set spring 18 located on the coupling pin 15, and a return spring 19 coupled between shift lever 1 and bracket 15a. The coupling plate 12 is fixed to the shift lever 1 and extends in a longitudinal direction of the vehicle. The control wire 4 is fixed to the coupling plate 12 by the coupling pin 15.

The coupling pin 15 has one end coupled with the control wire 4 in a conventional manner. A middle portion of the coupling pin 15 is attached to the coupling plate 12. Specifically, the coupling pin 15 is located in the pin through hole 13 of the coupling plate 12 in such a manner that it can slide freely in the lateral direction of the vehicle. The other end of the coupling pin 15 has the non-circular part 16 that has a pair of flat surfaces on its vertically facing (top and bottom) sides. On the tip of said other end The large diameter pin head 17 is securely fastened to the non-circular part 16 by fastener 17a, which can be for example, a bolt. The large diameter pin head 17 has a non-circular bore that receives to the non-circular part 16 such that no relative rotation can occur therebetween.

The slot 14 of the coupling plate 12 is arranged in a longitudinal direction to allow the non-circular part 16 of the coupling pin 15 to move toward the front of the vehicle. In other words, the slot 14 of the coupling plate 12 forms a longitudinal movement allowance slot that allows the coupling pin 15 to freely engage and disengage the pin through hole 13.

The set spring 18 is located between the pin head 17 and one lateral face of the coupling plate 12 for applying a force on the coupling pin 15 in such a direction that the circular shaft part of the coupling pin 15 is normally positioned in the pin through hole 13. Thus, the non-circular part 16 of the coupling pin 15 cannot normally engage the slot 14 for longitudinal movement toward the front of the vehicle. Thus, the coupling pin 15 is normally held in an initial position that prevents longitudinal movement of the coupling pin 15 towards the front of the vehicle.

When the coupling pin 15 is moved laterally through a prescribed stroke S in the direction to compress the set spring 18, the non-circular part 16 is positioned so that it can engage with the slot 14 of the pin through hole 13. Thus, in this position, the coupling pin 15 is can be moved in the longitudinal direction towards the front of the vehicle.

Meanwhile, a cam member 21 is provided on the base member 20 of the shift operation part. The cam member 21 has a slanted surface 21a that moves in sliding contact with the lateral perimeter of the pin head 17, when the shift lever 1 is shifted in the lateral direction of the vehicle from the stop position P to the reverse position R. In other words, when the lateral perimeter of the pin head 17 moves in sliding contact with the slanted surface 21a, this causes the coupling pin 15 to moves in the lateral direction of the vehicle. Thus, the coupling pin 15 moves from the initial position to a position where the non-circular part 16 faces the slot 14 of the pin through hole 13, and then the non-circular part 16 enters and engages with the slot 14.

Also, the return spring 19 is attached between the bracket 15a provided on the coupling pin 15 and the shift lever 1 for applying a force on the coupling pin 15 in the direction that the non-circular part 16 retreats from the slot 14.

Figure 13:
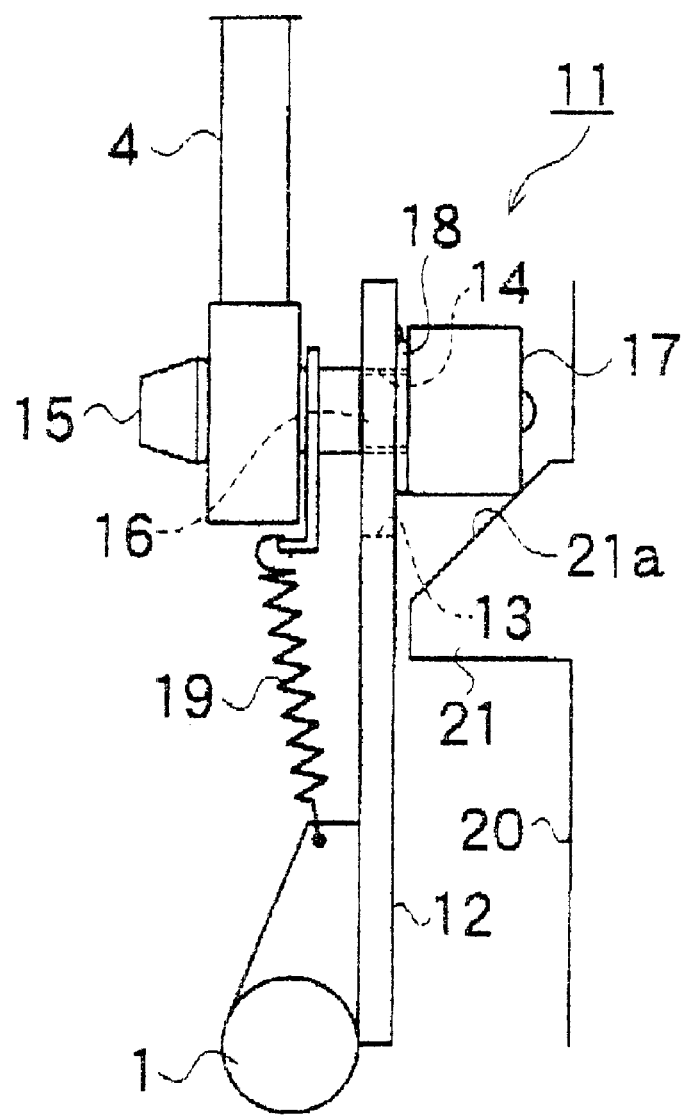
FIG. 13 is a simple schematic view illustrating the operating force direction-converting mechanism of FIG. 11 in the operating force direction-converting condition.
Figure 14:
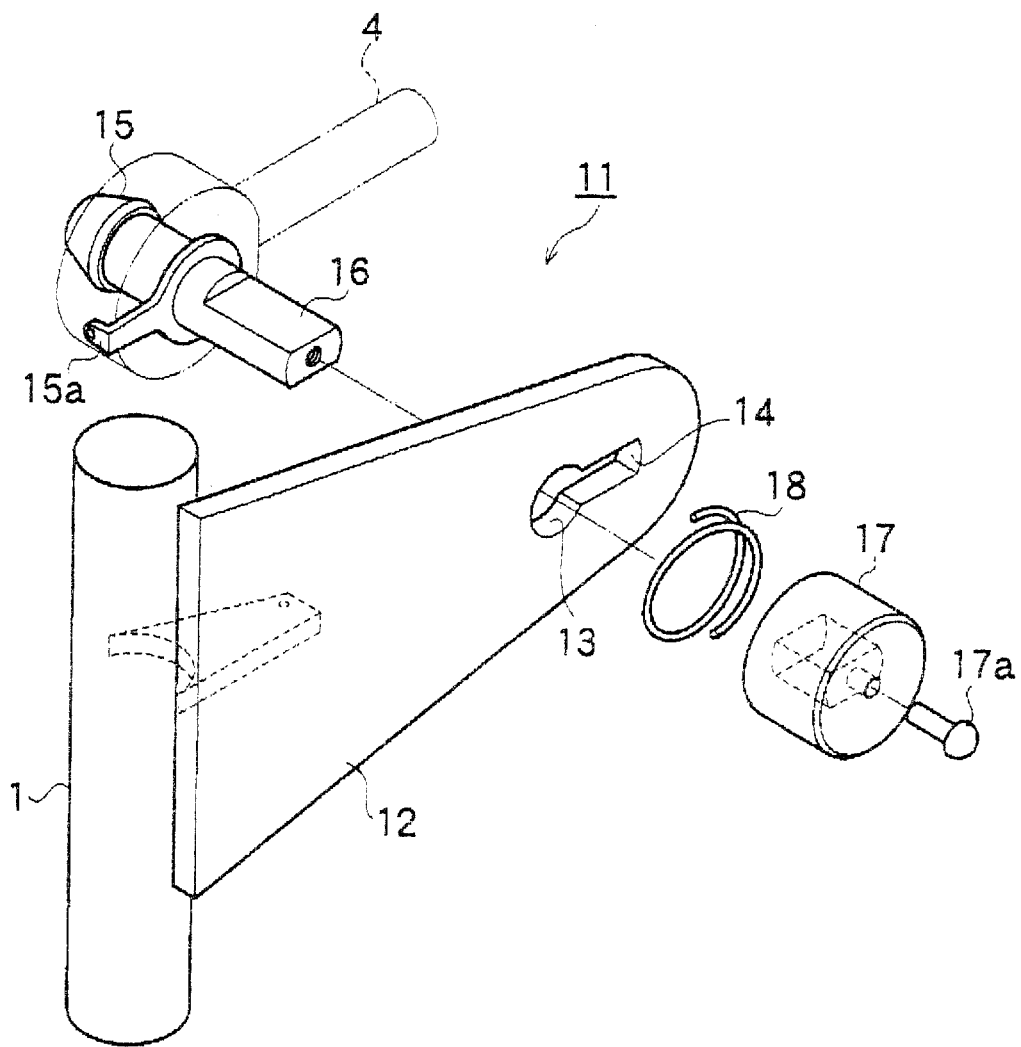
FIG. 14 is an exploded perspective view of the key components of the operating force direction-converting mechanism shown in FIG. 11.

The operating force direction-converting mechanism 11 of this embodiment functions as follows. When the shift lever 1 is shifted in the lateral direction of the vehicle from the stop position (FIG. 11) to the reverse position R (FIG. 13), the slanted surface 21a of the cam member 21 contacts the lateral perimeter of the pin head 17. This movement causes of the pin head 17 to shift laterally and compress the set spring 18. In other words, the coupling pin 15 slides in the direction opposite to the movement direction of the shift lever 1. When the coupling pin 15 has moved a prescribed stroke S, the non-circular part 16 of the coupling pin 15 will be aligned with the slot 14 of the pin through hole 13. The pin head 17 will then continue to slide along the slanted surface 21a of the cam member 21 as shown in FIG. 13 and the non-circular part 16 will then enter and engage the slot 14. As a result, the control wire 4 is pushed toward the front of the vehicle.

When the shift lever 1 is shifted in the lateral direction of the vehicle from the reverse position R to the stop position, the coupling pin 15 is pulled toward the rear of the vehicle by the spring force of the return spring 19. Thus, the non-circular part 16 retreats and disengages from the slot 14, and simultaneously, the coupling pin 15 slides in the direction opposite to the movement direction of the shift lever 1 by the spring force of the set spring 18. Thus, the mechanism passes from the state in FIG. 13 through the state shown in FIG. 12 and returns to the initial position shown in FIG. 11.

When the shift lever 1 is shifted between the stop position P and the reverse position R, the laterally directed operating force exerted by the shift lever 1 is reliably transmitted to the control wire 4 by the movement of the coupling pin 15 in the lateral and longitudinal directions of the vehicle. Also, when the shift lever 1 is operated in the longitudinal direction of the vehicle between the stop position P and the drive position D, the transmission of the longitudinally directed operating force to the control wire 4 is not hindered even to the slightest degree. This is because the coupling pin 15 holds the initial position when the shift lever 1 is in the stop position.

Alternate Operating Direction-Converting Mechanisms

Referring now to FIGS. 15 to 18, two alternative examples of operating force direction-converting mechanisms are illustrated for use with the second, third and fourth embodiments that involve shifting the shift lever 1 in the lateral direction of the vehicle when shifting between the parking position P or neutral position N and the reverse position R.

Figure 15:
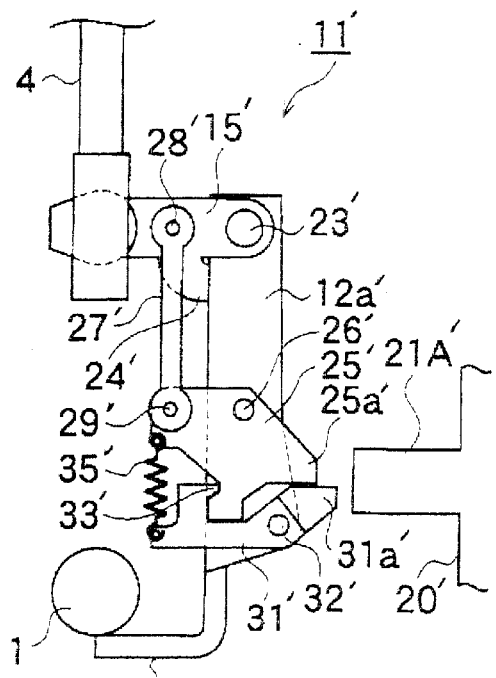
FIG. 15 is a simple schematic view of the operating force direction-converting mechanism of a second embodiment of the present invention.
Figure 16:
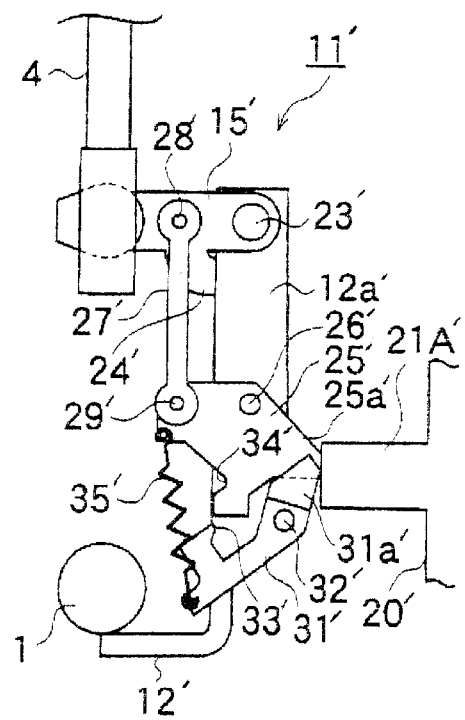
FIG. 16 is a simple schematic view illustrating the operating force direction-converting mechanism of FIG. 15 in an intermediate stage along the way to the operating force direction-converting condition.
Figure 17:
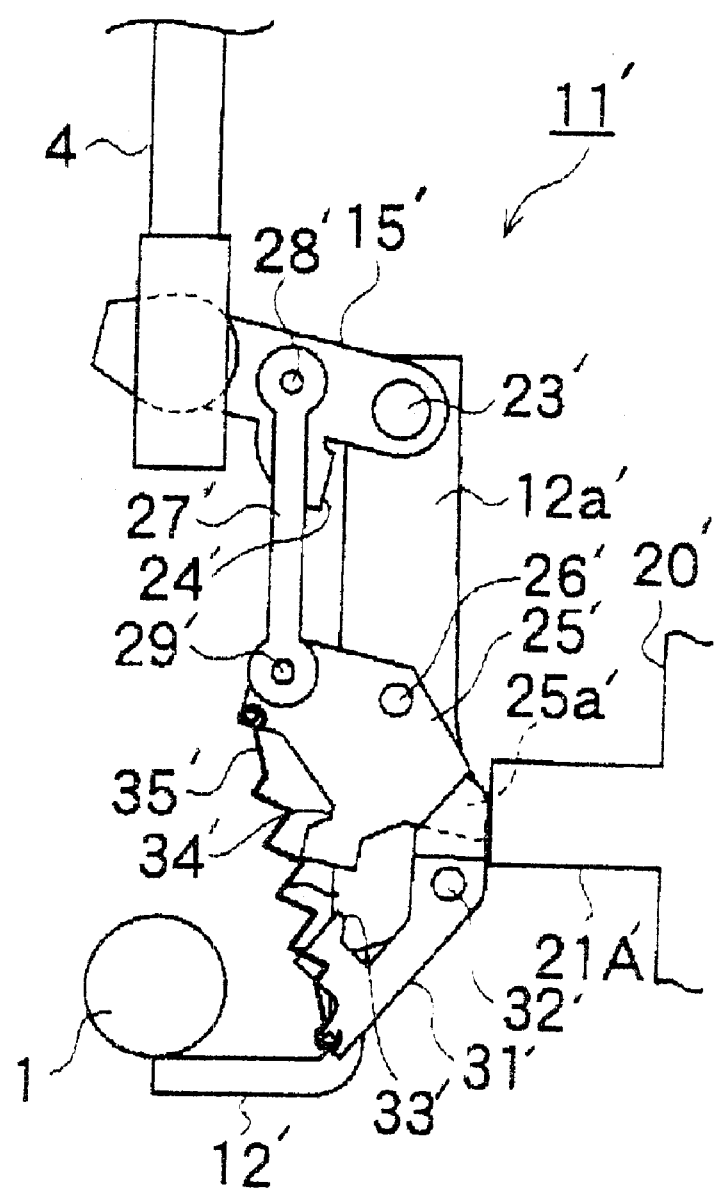
FIG. 17 is a simple schematic view illustrating the operating force direction-converting mechanism of FIG. 15 in the operating force direction-converting condition.

With the embodiment illustrated in FIGS. 15 to 17, the operating force direction-converting mechanism 11' basically includes a coupling plate 12', a coupling pin 15', a cam lever 25', a rod 27' coupled between the coupling pin 15' and the cam lever 25' by pins 28' and 29', a lock lever 31' coupled to coupling plate 12' by pin 32', and a return spring 35'.

The coupling plate 12' has a horizontal rack part 12a' that is formed on the upper edge of coupling plate 12'. One end of the coupling pin 15' is coupled with control wire 4 and the other end is pivotally attached to the front upper surface of rack part 12a' by the pin 23' in such a manner that it can swing freely in the longitudinal direction of the vehicle.

The coupling pin 15' is provided with a stopper member 24' that engages a lateral surface of the coupling plate 12'. The stopper member 24' restricts the swing movement of the coupling pin 15' in the rearward direction of the vehicle when the shift lever 1 is shifted from the drive position D to the stop position P.

The cam lever 25' is pivotally attached to the rack part 12a' by the pin 26' at a position that is longitudinally spaced from the coupling pin 15'. In other words, the cam lever 25' is located in a position offset toward the rear of the vehicle from the coupling pin 15'. The cam lever 25' is attached in such a manner that it can swing freely in the longitudinal direction of the vehicle.

A parallel linking mechanism is formed by linking the coupling pin 15' and the cam lever 25' with the rod 27' by pins 28' and 29'. The rod 27' is located at the middle section of the coupling pin 15' and at the end of the cam lever 25' opposite the end that has a cam part 25a'.

The cam part 25a' on one end of the cam lever 25' is arranged so that it projects in a sideways direction of the rack part 12a'. The cam part 25a' is formed in a slanted manner so that it swings toward the front of the vehicle when it contacts a cam member 21A' (discussed later).

The cam member 21A' is provided on the base member 20' of the shift operation part. When the shift lever 1 is shifted in the lateral direction of the vehicle from the stop position to the reverse position R, the flat end face of the cam member 21A' contacts the cam part 25a' of said cam lever 25' and swings the rod-linked side of the cam lever 25' toward the front of the vehicle.

The lock lever 31' locks the cam lever 25, which is pivotally attached to rack part 12a' by the pin 32' in a position adjacent to the cam lever 25' in such a manner that it can swing freely in the longitudinal direction of the vehicle. One end of the lock lever 31' projects farther to the side than the cam part 25a' of cam lever 25'. When the shift lever 1 is shifted in the lateral direction of the vehicle from the stop position P to the reverse position R, the shift lever 1 contacts the end face of the cam member 21A' before the cam lever 25' does and swings in the opposite direction as the cam lever 25'. A lock claw 33' provided on the other end of the lock lever 31' can be attached and detached from a lock groove 34' provided in the cam lever 25'.

In short, one end of the lock lever 31' is formed into a slanted cam part 31a' so that it can swing in the aforementioned direction when it contacts the end face of the cam member 21A'. This cam part 31a' is arranged in a position that is offset farther upward than the cam part 25a' of the cam lever 25' so that the two will not interfere with each other when they swing.

Also the return spring 35' is attached between the lock lever 31' and other end of the cam lever 25' for apply a force in the lock direction on the lock lever 31'.

The operating force direction-converting mechanism 11' of this embodiment functions as follows. When the shift lever 1 is shifted from the stop position (FIG. 15) to the reverse position R (FIG. 17) in the lateral direction of the vehicle. The cam part 31a' of the lock lever 31' contacts the end face of the cam member 21A' early and swings the other end of the lock lever 31' toward the rear of the vehicle against the spring force of the return spring 35'. As a result, the lock claw 33' is removed from the lock groove 34' and the locked state of the cam lever 25' is released.

When the cam part 25a' of the cam lever 25' contacts the end face of the cam member 21A', the cam lever 25' swings so that its rod-linked side moves toward the front of the vehicle as shown in FIG. 17. Through the rod 27', this cam lever movement swings the coupling pin 15' toward the front of the vehicle and pushes the control wire 4 toward the front of the vehicle.

When the shift lever 1 is shifted in the lateral direction of the vehicle from the reverse position R to the stop position, the coupling pin 15', cam lever 25', and lock lever 31' move in the reverse manner with respect to the movement previously described due to the spring force of the return spring 35'. Thus, the mechanism passes from the state shown in FIG. 17 through the state shown in FIG. 16 and returns to the initial position shown in FIG. 15.

Meanwhile, when the shift lever 1 is shifted toward the front of the vehicle from the drive position D to the stop position P shown in FIG. 15, the control wire 4 is properly pushed toward the front of the vehicle because the swing movement of the coupling pin 15' toward the rear of the vehicle is restricted by the stopper member 24'.

With the operating direction-converting mechanism 11' of this embodiment, the laterally directed operating force of the shift lever 1 when the same is shifted between the stop position and the reverse position R is reliably transmitted to the control wire 4 because it is converted to a swinging force of the coupling pin 15' in the longitudinal direction of the vehicle. Also, when the shift lever 1 is operated in the longitudinal direction of the vehicle between the stop position and the drive position, the transmission of the longitudinally directed operating force to the control wire 4 is not hindered to even the slightest degree because the swing movement of the coupling pin 15' in the longitudinal direction of the vehicle is restricted.

Figure 18:
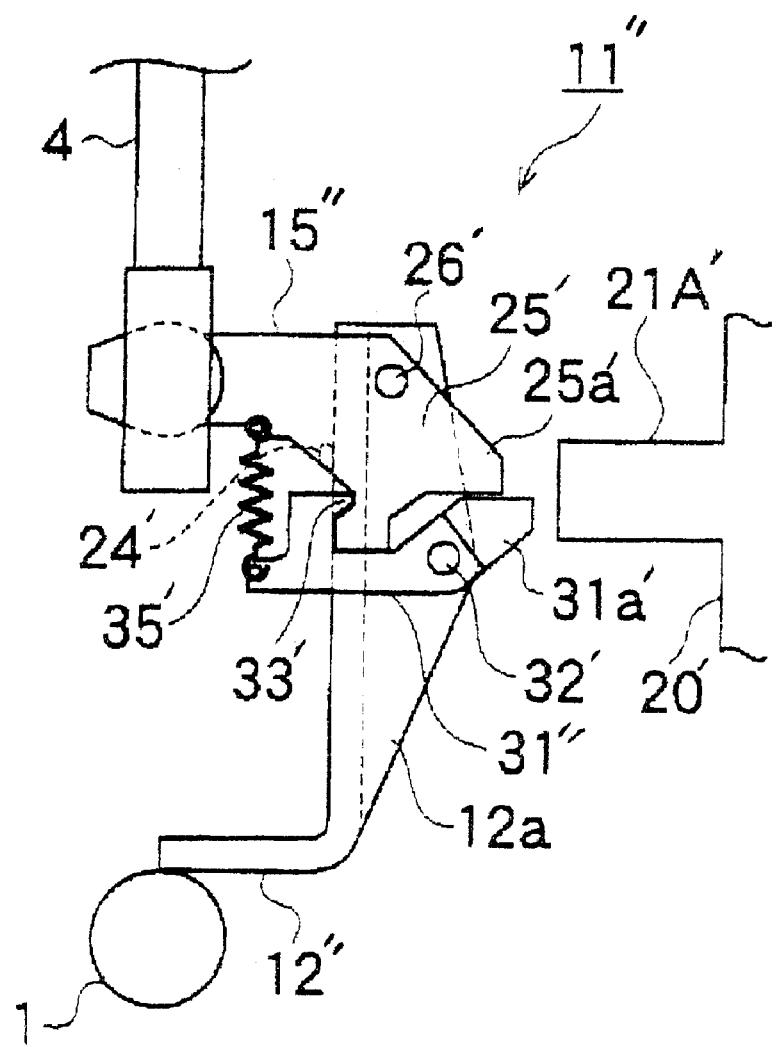
FIG. 18 is a simple schematic view of the operating force direction-converting mechanism of the third embodiment of the present invention.

FIG. 18 shows still another example of the operating force direction-converting mechanism 11". Since the operating force direction-converting mechanism 11" is very similar to the operating force direction-converting mechanism 11', some of the parts that are substantial identical will be given the same reference number. In this embodiment, the cam lever 25" of the embodiment corresponding to FIG. 15 is linked in an integral manner with coupling pin 15" and the coupling pin 15" is locked directly by the lock lever 31". Thus, this embodiment provides the same effects as the embodiment shown in FIGS. 15 to 17. In addition, this embodiment also provides a cost advantage by reducing the number of components and makes it possible construct a more compact operating force direction-converting mechanism 11". In particular, because the cam lever 25" is formed integrally with the coupling pin 15", the number of parts is reduced thus providing a cost advantage, and the operating force direction-converting mechanism 11" can be constituted in a more compact manner.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese patent Application No. 2000-153657. The entire disclosure of Japanese Patent Application No. 2000-153657 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents. Thus, the scope of the invention is not limited to the disclosed embodiments.

What is claimed is:

1. A shifting device for an automatic transmission, comprising:
 a shifting member with a shift lever movably arranged along a shift path between a stop position, a drive position, and a reverse position, the stop position being located in the shift path between the drive position and the reverse position such that the shift lever passes through the stop position when moved between the drive position and the reverse position, the shift path from the drive position to the stop position being oriented in a longitudinal direction of a vehicle, the shift path from the stop position to the reverse position including an operation oriented in a lateral direction of the vehicle; and
 a force transmitting apparatus including
  a control linking member having first and second end parts with the first end part operatively coupled to the shift lever to move in a line direction in response to movement of the shift lever;

a position converting lever operatively coupled to the second end part of the control linking member on a transmission side of the control linking member to pivot sequentially in a first pivot direction between operating positions that sequentially correspond to the stop position, the drive position, and the reverse position; and an operating force direction-converting mechanism operatively coupled between the first end part of the control linking member and the position converting lever to convert an acting direction of an operating force on the shift lever to the line direction of the control linking member when the shift lever is operated in the lateral direction of the vehicle between the stop position and the reverse position.

2. The shifting device as set forth in claim 1, wherein the stop position is a parking position.

3. The shifting device as set forth in claim 1, wherein the stop position is provided in a position preceding the drive position; and the reverse position is provided in a position preceding the stop position.

4. The shifting device as set forth in claim 1, wherein the operating force direction-converting mechanism includes a coupling plate fixedly coupled to the shift lever, the coupling plate having a pin through hole;

a coupling pin attached to the pin through hole of the coupling plate such that the coupling pin can slide freely in the lateral direction of the vehicle, a first end of the coupling pin coupled to the control linking member;

a non-circular part formed in a second end opposite to the first end of the coupling pin;

a slot formed in the coupling plate to communicate with the pin through hole of the coupling plate in the longitudinal direction of the vehicle, the slot arranged to allow the non-circular part to engage and disengage freely;

a pin head provided on the second end of the coupling pin;

a set spring arranged to apply a force on the coupling pin in a direction such that the non-circular part cannot engage with the slot, the set spring holds the coupling pin in an initial position;

a cam member sliding contact with the pin head such that the coupling pin moves in the lateral direction of the vehicle from the initial position to a position where the non-circular part can engage with the slot and the non-circular part enters and engages with the slot when the shift lever is operated in the lateral direction of the vehicle from the stop position to the reverse position; and a return spring arranged to apply a force on the coupling pin in the direction that the non-circular part retreats from the slot.

5. The shifting device as set forth in claim 1, wherein the operating force direction-converting mechanism includes a coupling plate fixedly coupled to the shift lever, the coupling plate having a pin through hole;

a coupling pin attached to the pin through hole of the coupling plate such that the coupling pin can slide freely in the lateral direction of the vehicle, a first end of the coupling pin coupled to the control linking member;

a non-circular part formed in a second end opposite to the first end of the coupling pin;

a slot formed in the coupling plate to communicate with the pin through hole of the coupling plate in the longitudinal direction of the vehicle, the slot arranged to allow the non-circular part to engage and disengage freely;

a pin head provided on the second end of the coupling pin;

a set spring arranged to apply a force on the coupling pin in a direction such that the non-circular part cannot engage with the slot, the set spring holds the coupling pin in an initial position;

a cam member sliding contact with the pin head such that the coupling pin moves in the lateral direction of the vehicle from the initial position to a position where the non-circular part can engage with the slot and the non-circular part enters and engages with the slot when the shift lever is operated in the lateral direction of the vehicle from the stop position to the reverse position; and a return spring arranged to apply a force on the coupling pin in the direction that the non-circular part retreats from the slot.

6. A shifting device for an automatic transmission, comprising:

a shifting member including a shift lever movably arranged along a shift path between a stop position, a drive position, and a reverse position, the stop position being located in the shift path between the drive position and the reverse position such that the shift lever passes through the stop position when moved between the drive position and the reverse position, the shift path from the drive position to the stop position being oriented in a longitudinal direction of a vehicle, the shift path from the stop position to the reverse position including an operation oriented in a lateral direction of the vehicle; and a force transmitting apparatus including a position converting lever on a transmission side;

a control linking member transmitting an operating force of the shift lever to the position converting lever; and an operating force direction-converting mechanism arranged to convert an acting direction of an operating force of the shift lever to a line direction of the control linking member when the shift lever is operated in the lateral direction of the vehicle between the stop position and the reverse position, the operating force direction-converting mechanism including a coupling plate fixedly coupled to the shift lever;

a coupling pin having a first end coupled with the control linking member, a second end opposite to the first end of the coupling pin pivotally attached to the coupling plate such that the coupling pin can swing freely in the longitudinal direction of the vehicle;

a stopper arranged to restrict a swing motion of the coupling pin when the shift lever is operated from the drive position toward the stop position;

a cam lever coupled to the coupling pin, the cam lever pivotally attaching to the coupling plate in such a manner that the cam lever can swing freely;

a cam member arranged to contact the cam lever and swing the coupling pin via the cam lever when the shift lever is operated in the lateral direction of the vehicle from the stop position to the reverse position;

a lock lever arranged to releasably lock the cam lever, the lock lever being arranged to be released from a locked state of the cam lever by contacting the cam member earlier than does the cam lever and swinging when the shift lever is operated in the lateral direction of the vehicle from the stop position to the reverse position; and a return spring being arranged to apply a force on the lock lever in the lock direction.

7. The shifting device as set forth in claim 6, wherein the cam lever is integrally formed with the coupling pin.

8. A shifting device for an automatic transmission, comprising:

a shifting member including a shift lever movably arranged along a shift path between a stop position, a drive position, and a reverse position, the stop position being located in the shift path between the drive position and the reverse position such that the shift lever passes through the stop position when moved between the drive position and the reverse position, the shift path from the stop position to the reverse position being oriented in a lateral direction of the vehicle; and a force transmitting apparatus including
  a position converting lever on a transmission side;
  a control linking member transmitting an operating force of the shift lever to the position converting lever; and
  an operating force direction-converting mechanism arranged to convert an acting direction of an operating force of the shift lever to a line direction of the control linking member when the shift lever is operated in the lateral direction of the vehicle between the stop position and the reverse position, the operating force direction-converting mechanism including
    a coupling plate fixedly coupled to the shift lever;
    a coupling pin having a first end coupled with the control linking member, a second end opposite to the first end of the coupling pin pivotally attached to the coupling plate such that the coupling pin can swing freely in the longitudinal direction of the vehicle;
    a stopper arranged to restrict a swing motion of the coupling pin when the shift lever is operated from the drive position toward the stop position;
    a cam lever coupled to the coupling pin, the cam lever pivotally attaching to the coupling plate in such a manner that the cam lever can swing freely;
    a cam member arranged to contact the cam lever and swing the coupling pin via the cam lever when the shift lever is operated in the lateral direction of the vehicle from the stop position to the reverse position;
    a lock lever arranged to releasable lock the cam lever, the lock lever being arranged to be released from a locked state of the cam lever by contacting the cam member earlier than does the cam lever and swinging when the shift lever is operated in the lateral direction of the vehicle from the stop position to the reverse position; and
    a return spring being arranged to apply a force on the lock lever in the lock direction.

9. A shifting device for an automatic transmission as set forth in claim 8, wherein the cam lever is integrally formed with the coupling pin.

10. A shifting device for an automatic transmission, comprising:

shifting means for shifting the automatic transmission along a shift path between a stop position, a drive position, and a reverse position, the stop position being located in the shift path between the drive position and the reverse position such that the shifting means passes through the stop position when moved between the drive position and the reverse position, the shift path from the drive position to the stop position being oriented in a longitudinal direction of a vehicle, the shift path from the stop position to the reverse position including a shift operation oriented in a lateral direction of the vehicle; and control linking means for transmitting a shift force from the shift means in a line direction in response to movement of the shift lever along the shift path;

position converting means for converting the line direction of the shift force from the control linking means to sequential pivot movements such that in a first pivot direction between operating positions that sequentially correspond to the stop position, the drive position, and the reverse position of the movement of the shift lever along the shift path; and operating force direction-converting means for converting an acting direction of the shift operating force on the shift lever to the line direction of the control linking means when the shift lever is operated in the lateral direction of the vehicle between the stop position and the reverse position.

11. The shifting device as set forth in claim 10, wherein the stop position is a parking position.

12. The shifting device as set forth in claim 10, wherein the stop position is provided in a position preceding the drive position; and the reverse position is provided in a position preceding the stop position.

13. The shifting device as set forth in claim 10, wherein the operating force direction-converting mechanism includes a coupling plate fixedly coupled to the shift lever, the coupling plate having a pin through hole;
a coupling pin attached to the pin through hole of the coupling plate such that the coupling pin can slide freely in the lateral direction of the vehicle, a first end of the coupling pin coupled to the control linking member;
a non-circular part formed in a second end opposite to the first end of the coupling pin;
a slot formed in the coupling plate to communicate with the pin through hole of the coupling plate in the longitudinal direction of the vehicle, the slot arranged to allow the non-circular part to engage and disengage freely;
a pin head provided on the second end of the coupling pin;
a set spring arranged to apply a force on the coupling pin in a direction such that the non-circular part cannot engage with the slot, the set spring holds the coupling pin in an initial position;
a cam member sliding contact with the pin head such that the coupling pin moves in the lateral direction of the vehicle from the initial position to a position where the non-circular part can engage with the slot and the non-circular part enters and engages with the slot when the shift lever is operated in the lateral direction of the vehicle from the stop position to the reverse position; and
a return spring arranged to apply a force on the coupling pin in the direction that the non-circular part retreats from the slot.

14. A shifting device for an automatic transmission, comprising:

shifting means for shifting the automatic transmission along a shift path between a stop position, a drive position, and a reverse position, the stop position being located in the shift path between the drive position and the reverse position such that the shifting means passes through the stop position when moved between the drive position and the reverse position, the shift path from the drive position to the stop position is oriented in a longitudinal direction of a vehicle, and the shift path from the stop position to the reverse position includes an operation oriented in a lateral direction of the vehicle, the shifting means including a shift lever, and a force transmitting apparatus including
- a position converting lever on a transmission side;
- a control linking member transmitting an operating force of the shift lever to the position converting lever; and
- an operating force direction-converting mechanism arranged to convert an acting direction of an operating force of the shift lever to a line direction of the control linking member when the shift lever is operated in the lateral direction of the vehicle between the stop position and the reverse position, the operating force direction-converting mechanism including
  - a coupling plate fixedly coupled to the shift lever;
  - a coupling pin having a first end coupled with the control linking member, a second end opposite to the first end of the coupling pin pivotally attached to the coupling plate such that the coupling pin can swing freely in the longitudinal direction of the vehicle;
  - a stopper arranged to restrict a swing motion of the coupling pin when the shift lever is operated from the drive position toward the stop position;
  - a cam lever coupled to the coupling pin, the cam lever pivotally attaching to the coupling plate in such a manner that the cam lever can swing freely;
  - a cam member arranged to contact the cam lever and swing the coupling pin via the cam lever when the shift lever is operated in the lateral direction of the vehicle from the stop position to the reverse position;
  - a lock lever arranged to releasably lock the cam lever, the lock lever being arranged to be released from a locked state of the cam lever by contacting the cam member earlier than does the cam lever and swinging when the shift lever is operated in the lateral direction of the vehicle from the stop position to the reverse position; and
  - a return spring being arranged to apply a force on the lock lever in the lock direction.

* * * * *